3,008,869
NEMATOCIDE COMPOSITIONS

Thomas R. Hopkins, Joplin, Mo., Ralph P. Neighbors, Miami, Okla., and Otto L. Hoffmann, Pittsburg, Kans., assignors to Spencer Chemical Company, a corporation of Missouri
No Drawing. Filed Dec. 14, 1956, Ser. No. 628,213
15 Claims. (Cl. 167—22)

This invention relates to the control of nematodes and compositions therefor. More particularly, this invention relates to the control of nematodes by the use of alpha, beta-dihalopropionic acids and the amide, nitrile, salts and esters thereof.

Nematodes are non-segmented worms found in the soil, in plant life and in animal life, including the hookworm, pinworm, roundworm, trichina, gapeworm, Guinea worm and whip worm. The term "nematode" as used herein is intended to include all forms through which nematodes pass in a life cycle, such as eggs, larvae and adults. Plant nematodes or eelworms range in length from less than one sixty-fourth of an inch to about one-eighth of an inch. Plant nematodes are found in all soils in which plants will grow, and consequently every major crop is a potential victim of this pest. The annual damage as either directly or indirectly incurred from nematodes may be as great as three billion dollars.

Since the first steps to control nematodes by a chemical treatment in 1881, employing carbon disulfide, there has not been a material introduced which was entirely satisfactory. Even the most promising compounds which have become commercially available provide inadequate control and are expensive, toxic to animals, and phytotoxic to many plants as well.

We have discovered that alpha,beta-dihalopropionic acids and the amide, nitrile, salts and esters thereof are effective in the control of plant and animal nematodes in the environment in which they naturally occur. Plant and soil nematodes may be effectively treated in situ while animal nematodes may be effectively treated in vivo. More specifically, compounds of the formula

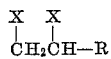

wherein X is bromine or chlorine and R represents the CN, $CONH_2$ and

groups wherein R' is hydrogen, a metal ion, a lower alkyl group, a lower alkene group, aryl groups, an aryl lower alkyl group and a cycloalkyl group have been found to possess nematocidal activity. Representative compounds having such activity are those of the above formula in which R' is an alkali metal or alkaline earth metal; a lower straight or branched, substituted or unsubstituted lower alkyl group such as methyl, ethyl, propyl, sec-butyl and the like; alkene groups such as the allyl group; aryl and substituted aryl groups such as phenyl, naphthyl, halophenyl, hydroxyphenyl, lower alkoxyphenyl, nitrophenyl and phenylazophenyl; and aryl lower alkyl groups such as methylphenyl and ethylphenyl.

When used in the treatment of soils at the recommended nematocidal rates these compounds are not phytotoxic. Since the compounds are not appreciably volatile at low temperatures, in contrast to other commercially avaliable nematocides, they are very easy to apply with the ordinary type of spray or dusting equipment. Their low volatility provides a persistence after application which insures a more thorough and prolonged exposure of the chemical to the nematodes.

Low mammalian toxicity, in which the $LD_{50}$ on rats (orally) is greater than 2500 mg./kilogm., makes application of the compounds to soils safe.

The following test procedures were employed in evaluating the compounds:

CONTACT TESTS

Water suspensions of the test chemicals were prepared in the concentration series of 500, 50, 5 and 0.5 p.p.m. Each concentration was placed in a separate quadrant of a Felsen dish or in a separate stoppered test tube. Freshly hatched larvae were then added to each quadrant or test tube. After 24 hours, and again after 7 days, the contents of each quadrant or test tube was observed through a microscope. If a significant percentage kill was obtained, the dead nematodes were counted and the percentage kill recorded as compared with the control containing no chemical. If all of the nematodes were killed in each quadrant of the Felsen dish the test was repeated with each concentration in separate dishes.

POT TEST

Water suspensions of the test chemicals were prepared in concentrations corresponding to 100 lbs. and 10 lbs. per acre. Four inch clay pots were filled with a soil which was infested with the nematode. The chemical suspension was then applied to the soil, and after one week, tomato seedlings were placed in the pots. After 6–8 weeks, the plants were removed and observed for the presence of nematode damage.

FUMIGATION TEST

This method consists of placing the nematode larvae in sand or soil in contact with the chemical in sealed jars for 24 hours. The nematodes were then decanted and examined for viability. The results of the test represent the effect of both fumigation and contact.

The results of the tests performed on some of the active alpha, beta-dihalopropionic acid compounds are included below for comparison.

Table

| Nematocides | Contact Test @ 500, 50, 5 and 0.5 p.p.m. Lowest Effective Concentration (p.m.p) | | Fumigation Test— Lowest Effective Concentration (p.p.m.) | | Soil Treatment (Pot) Test Root Knot (Meloidogyne) Nematode |
|---|---|---|---|---|---|
| | Panagrellus or Ditylenchus | | Rhabitus and/or Panagrellus | | |
| | 24 Hrs. | 7 days | Sand | Soil | |
| α,β-dichloropropionic acid | <99% @ 500 b | 99% @ 500 b | | | |
| methyl-α,β-dichloropropionate | 50 b | 50 b | 10 | NS | 100% control @ 100#/A. |
| α,β-dichloropropionamide | <99% @ 500 a | 50 a | 10 | NS | 85% control @ 100#/A. |
| α,β-dichloropropionitrile | 50 a | 50 a | | 10 | 100% control @ 100#/A. | a Panagrellus.
b Ditylenchus.

The optimum rate of application, as far as plant parasitic nematodes are concerned, will depend upon the type of plant present as well as such factors as pH of the soil, soil condition, climatic conditions, and the particular type of nematode being treated. We have found, however, that excellent control of the Meloidogyne species, without danger of phytotoxicity, is exhibited at a dosage of about 100–250 lbs. per acre. Lower rates are effective if the agent is thoroughly mixed with the soil. Some members of the group, such as the nitrile and amide, are preferable for their higher activities or lower permissible rates of application. Very small amounts of these, such as 10 lbs. per acre, may thus be effective against nematodes in soil and plants.

The application of the alpha,beta-dihalopropionic acids and derivatives to soils is readily achieved by the use of novel concentrates and compositions containing these compounds as the active ingredients. To achieve a suitable dispersion on soils it is most convenient to employ compositions in which the active compound is combined with an inert carrier or diluent. The carrier may be a solvent which will dissolve the active agent. It also may be a solvent which will not dissolve the compound for suitable dispersions. Such compositions may be effective. Such compositions may be sprayed on the soil. Solid carriers, particularly powders of either organic or mineral composition, are also suitable for use in the compositions. Some such solid carriers are talc, clay and pulverized limestone. Dusting is a convenient way to apply such powdered compositions.

Water may be preferred as the carrier because it is widely available and inexpensive. For those compounds which are partially or essentially insoluble in water, however, there should be included in the composition a surface active agent which will provide a homogeneous mixture from which the nematocidal compound will not settle out rapidly. The surface active agent may be ionic or nonionic and may be a liquid or solid. Typical satisfactory surface active agents which may be used are alkali metal-higher alkylarylsulfonates such as sodium dodecylbenzenesulfonate, fatty alcohol sulfates such as the sodium salts of the monoesters of sulfuric acid with n-aliphatic alcohols containing 8–18 carbon atoms, sodium salts of alkyl-naphthalenesulfonic acids, long chain quaternary ammonium compounds, sodium salts of petroleum-derived alkyl-sulfonic acids, polyoxyethylene sorbitan mono-oleate and alkylaryl polyether alcohol. An adjuvant liquid may also be included in such compositions. Such liquid may be either soluble or insoluble in water and may be any solvent such as an alcohol, benzene, toluene, kerosene, or hexane, which aids in solubilizing or dispersing the active nematocidal agent in water.

Concentrated compositions containing the active nematocidal agent which may be subsequently diluted, as with water, to the desired concentration for application to soil are also provided. The advantages of such concentrates are that they are prepared by the manufacturer in a form such that the user need only mix them with a locally available carrier, preferably water, thereby keeping shipment costs to a minimum while providing a product which may be used with a minimum of equipment and effort. Such concentrates may contain about 50% or more of the active nematocidal agent with a carrier or diluent, which may be a solid or liquid. Liquid carriers which either dissolve the active agent or other liquids in which this compound may be suspended may be used. A wetting or surface active agent is also generally included to facilitate such dilution or dispersion in water. However, the wetting agent itself may comprise the carrier in such concentrates.

Wettable powdered concentrates are prepared by mixing the active nematocidal agent with an inert solid diluent such as fuller's earth, bentonite and hydrated aluminum magnesium silicate and a wetting agent. One representative wettable powder has the composition:

50% (wt.) alpha,beta-dihalopropionic acid or a derivative thereof
40% hydrated aluminum magnesium silicate
7% sodium alkylnaphthalenesulfonate
2% ligninsulfonate
1% methyl cellulose A wettable powder such as this when mixed with water forms a dispersion which is particularly suitable for spray application to the soil.

The following emulsifiable concentrate is particularly useful for high dilution rates:

30% (wt.) alpha,beta-dihalopropionic acid or a derivative thereof
10% Triton X–151: blend of an alkylaryl polyether alcohol and organic sulfonate
10% Atlas CIPC emulsifier: a polyoxyethylene fatty acid ester
25% cyclhexanone
25% xylene As previously indicated above, an alpha,beta-dihalopropionic acid or a derivative thereof may be used against nematodes in animals. Animals infested with nematodes may be treated by the administration of such compounds. Oral administration is preferred although other conventional routes of administration also may be followed. Although one such pure compound may be administered alone, it is preferable to administer it in combination with a pharmaceutical carrier or diluent, which may be either a suitable liquid or solid.

Solid pharmaceutical carriers such as starch, sugar, talc and the like may be used to form powders. The powders may be used as such or be tableted or be used to fill capsules. Suitable lubricants like magnesium stearate, binders such as gelatin and disintegrating agents like sodium carbonate in combination with citric acid may be used to form the tablets.

Unit-dosage forms such as tablets and capsules may contain any suitable predetermined amount of an alpha, beta-dihalopropionic acid or derivative thereof and may be administered one or more at a time at regular intervals. Such forms should generally contain a minimum concentration of 0.1% by weight of active compound.

A typical tablet may have the composition:

|   | Mg. |
|---|---|
| (1) Alpha,beta-dihalopropionic acid or a derivative thereof | 10 |
| (2) Starch, U.S.P. | 57 |
| (3) Lactose, U.S.P. | 73 |
| (4) Talc, U.S.P. | 9 |
| (5) Stearic acid | 6 |

Powders 1, 2 and 3 are slugged, then granulated, mixed with 4 and 5, and tableted.

Tablets may also be made from the following ingredients from the stated quantities:

|   | Grams |
|---|---|
| (1) Alpha,beta-dihalopropionic acid or a derivative thereof | 2000 |
| (2) Lactose, U.S.P. | 800 |
| (3) Dibasic calcium phosphate, U.S.P. | 1527.2 |
| (4) Starch, U.S.P. | 799.3 |
| (5) Calcium stearate | 56.7 |
| (6) Gelatin solution 1.5 lb./gal. H$_2$O. |  |

Powders 1, 2 and 4 are granulated, using enough gelatin solution to wet the mixture. The granules are then combined with the other ingredients, gelatin solution is added to wet the mixture, and it is tableted. The size of the tablets may be varied at will although tablets of 0.25 to 0.50 gram are quite satisfactory for many uses.

Capsules are prepared by filling No. 3 hard gelatin capsules with the following ingredients, thoroughly mixed.

|   |   | Mg. |
|---|---|---|
| (1) | Alpha,beta-dihalopropionic acid or a derivative thereof | 15 |
| (2) | Lactose, U.S.P. | 200 |
| (3) | Starch, U.S.P. | 16 |
| (4) | Talc, U.S.P. | 8 |

Administration to large numbers of animals, especially small animals, may be readily effected by adding the active nematocidal agent to the drinking water or a feedstuff for the animals. To introduce the active agent into a feedstuff it is convenient to employ a premix in which the agent is first mixed with an inert carrier such as ground oyster shells, Attapulgus clay, distiller's dried grains and edible vegetable substances and the premix subsequently thoroughly dispersed in the feedstuff. For treating nematodes in animals a concentration of at least 0.1% by weight in the feedstuffs is preferred although lower concentrations give some control. Unit-dosage forms such as tablets and capsules, however, may conveniently contain a minimum of about 2 mg. of the active compound and a maximum of 100 mg. per kilogram of body weight of the animal being treated. However, unit dosages may contain as little as 1 mg. for small animals and as much as 10,000 mg. for large animals. The general unit-dosage forms, however, contain about 5–300 mg. of active agent. The weight of the active agent in the unit dosages may comprise up to about 80–90% of the total weight and even higher.

Various changes and modifications of the invention can be made, and, to the extent that such variations incorporate the spirit of this invention, they are intended to be included within the scope of the appended claims.

We claim:

1. A nematocidal composition comprising a member of the group consisting of a nematocidal compound of the formula

a surface active agent and an inert carrier of the group consisting of water and inert solid diluents, wherein X is a halogen of the group consisting of bromine and chlorine, and R' is a member of the group consisting of hydrogen, alkali metals and alkaline earth metals.

2. The composition of claim 1 in which the inert solid diluent is a powder.

3. The composition of claim 1 in which the carrier is water.

4. The composition of claim 1 in which the carrier is water and at least 50% by weight of the composition is the nematocidal compound.

5. The composition of claim 2 in the form of a wettable powder.

6. A composition in dosage unit form for treating nematodes comprising a pharmaceutical carrier and a nematocidal amount of an active compound of the formula

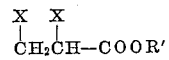

wherein X is a halogen of the group consisting of bromine and chlorine, and R' is a member of the group consisting of hydrogen, alkali metals and alkaline earth metals.

7. A tablet according to claim 6 in which at least 0.1% by weight of the tablet is the active compound.

8. A capsule according to claim 6 in which at least 0.1% by weight of the capsule is the active compound.

9. The method of treating parasitic nematodes which comprises contacting the nematodes with a nematocidal amount of an active compound of the formula

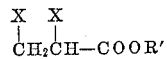

wherein X is a halogen of the group consisting of bromine and chlorine, and R' is a member of the group consisting of hydrogen, alkali metals and alkaline earth metals.

10. The method of claim 9 in which an animal is treated with the active compound in a concentration sufficient to eliminate the nematodes but insufficient to produce serious toxic effects in the animal.

11. The method of claim 9 in which plant parasitic nematodes are treated by applying the active compound to soils and plants infected with nematodes.

12. The method of claim 11 in which 10 to 250 pounds of the active compound are applied per acre.

13. The method of claim 10 in which the administration is oral.

14. The method of claim 13 in which the active compound is in a feedstuff for the animal.

15. A nematocidal composition comprising a member of the group consisting of a nematocidal compound of the formula

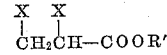

an inert organic liquid, and a surface active agent, wherein X is a halogen of the group consisting of bromine and chlorine, and R¹ is a member of the group consisting of hydrogen, alkali metals and alkaline earth metals.

References Cited in the file of this patent

UNITED STATES PATENTS

| 1,982,909 | Flint | Dec. 6, 1934 |
|---|---|---|
| 2,217,905 | Hoffman | Oct. 15, 1940 |
| 2,282,732 | Lean | May 12, 1942 |
| 2,344,105 | Peters | Mar. 14, 1944 |
| 2,390,470 | Sumner | Dec. 4, 1945 |
| 2,419,073 | Hammer | Apr. 15, 1947 |
| 2,435,204 | Davidson | Feb. 3, 1948 |
| 2,448,265 | Kagy | Aug. 31, 1948 |
| 2,473,984 | Bickerton | June 21, 1949 |
| 2,543,580 | Kay | Feb. 27, 1951 |
| 2,701,224 | Stansbury | Feb. 1, 1955 |
| 2,726,485 | Thomas | Dec. 13, 1955 |
| 2,730,547 | Dye | Jan. 10, 1956 |
| 2,743,209 | Jones | Apr. 24, 1956 |
| 2,757,117 | Birum | July 31, 1956 |
| 2,770,638 | Grolito | Nov. 13, 1956 |
| 2,779,680 | Wolf | Jan. 29, 1957 |
| 2,802,021 | Heininger | Aug. 6, 1957 |
| 2,802,831 | Wheeler | Aug. 13, 1957 |
| 2,852,426 | Stansbury | Sept. 16, 1958 |

FOREIGN PATENTS

| 124,387 | Australia | June 12, 1947 |
|---|---|---|

OTHER REFERENCES

King: U.S.D.A. Handbook No. 69, May 1954, p. 284.

Frear: Chemistry of the Insecticides, Fungicides and Herbicides, 2nd ed., 1948, pp. 108, 122.

King: (I) U.S.D.A. Handbook No. 69, May 1954 p. 284, p. 293.

UNITED STATES PATENT OFFICE
CERTIFICATE OF CORRECTION

Patent No. 3,008,869            November 14, 1961

Thomas R. Hopkins et al.

It is hereby certified that error appears in the above numbered patent requiring correction and that the said Letters Patent should read as corrected below.

Columns 1 and 2, in the table, column 2, in the heading, line 4 thereof, for "(p.m.p.)" read -- (p.p.m.) --; column 6, under the heading "UNITED STATES PATENTS" add the following:

2,502,244    Carter-------- Mar. 28, 1950

Signed and sealed this 17th day of April 1962.

(SEAL)
Attest:

ESTON G. JOHNSON

Attesting Officer

DAVID L. LADD

Commissioner of Patents